US010762225B2

(12) United States Patent
Hesketh et al.

(10) Patent No.: US 10,762,225 B2
(45) Date of Patent: Sep. 1, 2020

(54) NOTE AND FILE SHARING WITH A LOCKED DEVICE

(71) Applicant: Microsoft Technology Licensing, LLC, Redmond, WA (US)

(72) Inventors: John B. Hesketh, Kirkland, WA (US); Charlene M. Atlas, Redmond, WA (US); Jamie Cabaccang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 218 days.

(21) Appl. No.: 15/867,954

(22) Filed: Jan. 11, 2018

(65) Prior Publication Data

US 2019/0213344 A1 Jul. 11, 2019

(51) Int. Cl.
*G06F 21/62* (2013.01)
*G06F 21/31* (2013.01)
*G06F 16/176* (2019.01)
*H04L 29/08* (2006.01)

(52) U.S. Cl.
CPC ........ *G06F 21/6218* (2013.01); *G06F 16/176* (2019.01); *G06F 21/31* (2013.01); *H04L 67/06* (2013.01)

(58) Field of Classification Search
CPC .... G06F 21/6218; G06F 16/176; G06F 21/31; H04L 67/06
See application file for complete search history.

(56) References Cited

U.S. PATENT DOCUMENTS

| 8,218,734 | B2 | 7/2012 | Bhupati | |
| 8,719,528 | B2* | 5/2014 | Kimura | G06F 12/1458 711/163 |
| 8,910,243 | B2* | 12/2014 | Kang | G06F 21/31 380/205 |
| 9,027,117 | B2 | 5/2015 | Wilairat | |
| 9,098,695 | B2 | 8/2015 | Hicks | |
| 9,380,463 | B2* | 6/2016 | Lee | H04W 12/08 |
| 9,391,995 | B2* | 7/2016 | Stuntebeck | H04L 63/102 |
| 9,485,255 | B1* | 11/2016 | Avital | H04L 63/10 |
| 9,606,643 | B2 | 3/2017 | Aguera-Arcas et al. | |
| 9,749,269 | B2* | 8/2017 | Jung | G06Q 10/10 |
| 2008/0310602 | A1 | 12/2008 | Bhupati | |
| 2011/0184998 | A1* | 7/2011 | Palahnuk | G06F 11/1464 707/827 |

(Continued)

FOREIGN PATENT DOCUMENTS

WO 2016059564 A1 4/2016

OTHER PUBLICATIONS

"International Search Report and Written Opinion Issued in PCT Application No. PCT/US18/066617", dated Feb. 13, 2019, 12 Pages. (MS# 403454-WO-PCT).

*Primary Examiner* — Christopher A Revak
(74) *Attorney, Agent, or Firm* — Holzer Patel Drennan

(57) ABSTRACT

The herein described technology facilitates sharing of notes and files with a locked computing device. The locked computing device may receive a file sharing request that includes a file identifier identifying a location of a source file. The locked processing device provides a user account of the processing device with access to content of the source file responsive to authentication of a recipient access credential associated with the user account.

19 Claims, 5 Drawing Sheets

(56) References Cited

U.S. PATENT DOCUMENTS

| | | |
|---|---|---|
| 2013/0047268 A1* | 2/2013 | Arat .................... G06F 21/6218 |
| | | 726/28 |
| 2013/0150019 A1 | 6/2013 | Lee |
| 2013/0305354 A1 | 11/2013 | King et al. |
| 2014/0223542 A1 | 8/2014 | Hicks et al. |
| 2014/0372896 A1 | 12/2014 | Raman |
| 2016/0044091 A1 | 2/2016 | Doumet |
| 2016/0077606 A1* | 3/2016 | Hyun ........................ G06F 3/14 |
| | | 345/156 |
| 2017/0115998 A1* | 4/2017 | Fang ....................... H04M 1/67 |
| 2017/0124562 A1* | 5/2017 | Hessler ................ H04W 12/06 |
| 2017/0171239 A1 | 6/2017 | Miller |
| 2018/0101671 A1* | 4/2018 | Davis ...................... G07C 9/29 |
| 2018/0285966 A1* | 10/2018 | Xu ..................... G06Q 30/0645 |
| 2019/0073272 A1* | 3/2019 | Marcotte ............ G06F 11/1458 |

\* cited by examiner

NOTE AND FILE SHARING WITH A LOCKED DEVICE

BACKGROUND

Despite the recent rise in popularity and use of document sharing and collaboration platforms, such as OneDrive®, GoogleDocs®, and Dropbox®, there still exist circumstances where such file-sharing platforms are inadequate. Within large organizations, for example, directory permissions may present obstacles to file sharing in certain circumstances. When, for example, document permissions are fixed by workgroup, it can be burdensome for users in one workgroup to determine how to enable file sharing with one or more users in another workgroup with different permissions. Consequently, it remains commonplace to share files through more traditional means—such as by placing a file on a portable storage device (e.g., a USB stick, disk, or portable drive) and physically delivering the portable storage device to a recipient who may then copy the select file to his or her computer.

These in-person file transfers are further complicated by the requisite presence of both the file-sharer and the file-recipient in a same physical location to securely complete such a transfer. If, for example, a file-sharer walks into the office of a co-worker who has left for lunch and locked his or her computer, the file-sharer may have to return at a later time or risk leaving sensitive information (e.g., the USB stick) in an unsecure location where stored information could be viewed and/or misappropriated by an unauthorized recipient.

SUMMARY

A method disclosed herein provides for receiving a file sharing request at a locked processing device. The file sharing request includes a file identifier identifying a location of a source file, and the method further includes providing a user account of the processing device with access to content of the source file responsive to authentication of a recipient access credential associated with the user account.

This Summary is provided to introduce an election of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

DETAILED DESCRIPTION

Figure 1:
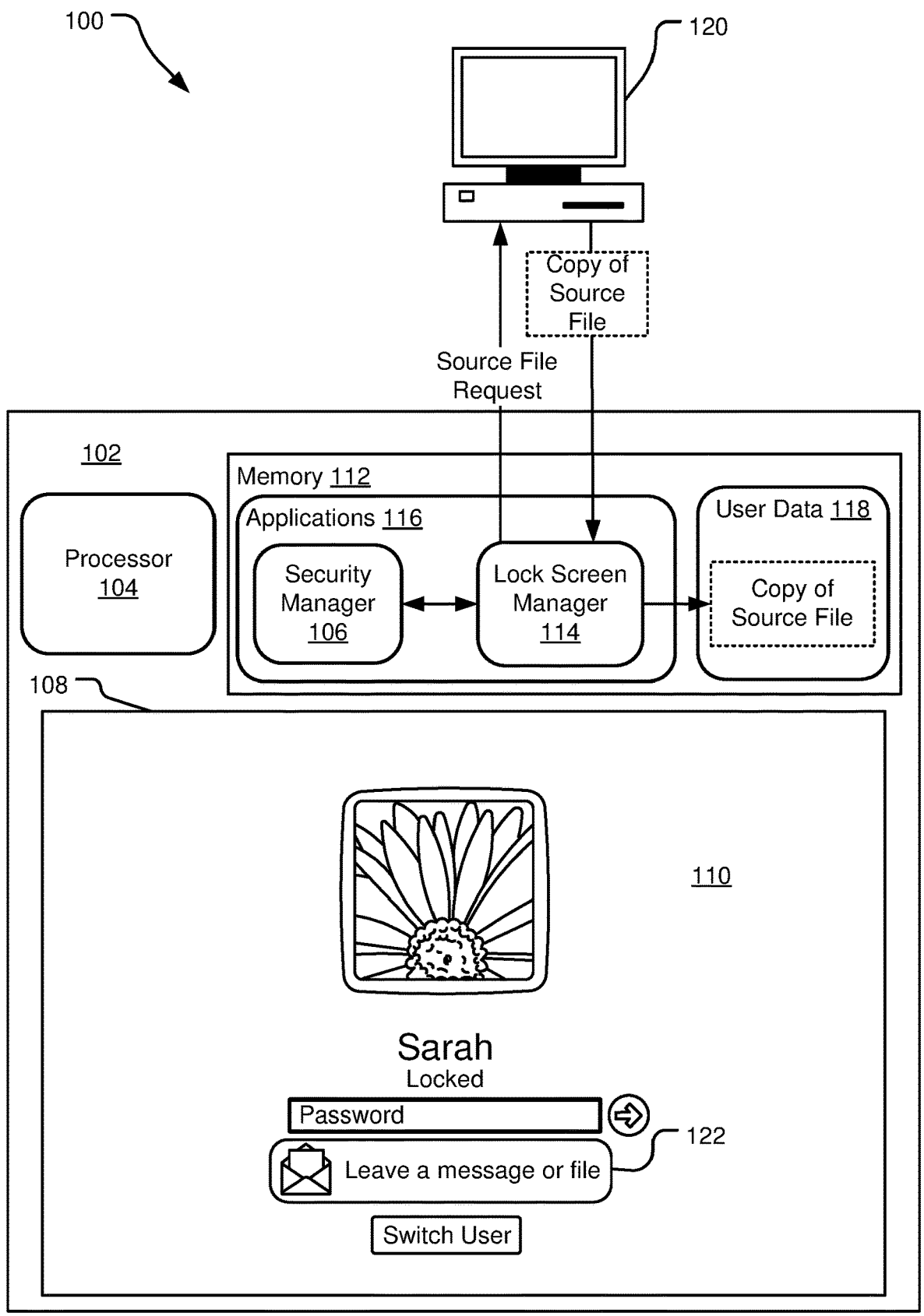
FIG. 1 illustrates an example system for sharing data, such as files and/or notes, with a locked device.

FIG. 1 illustrates an example system 100 for sharing data, such as files and/or notes, with a locked device. The system 100 allows a first user, a "messenger" to securely transfer a file to a second user, an "intended recipient," by copying the file to a locked device on which the messenger does not have access to a user account. According to one implementation, the messenger interacts with a lock screen 110 on a display 108 to initiate copying of a file and saving the copy to a directory associated with a user account on the locked device. Subsequent access to the copied file may be conditioned on the valid authentication of access credentials associated with the intended recipient, such as an access credential to the user account of the locked device and/or an access credential for a network account with access to a directory where the copied file is stored.

The system of FIG. 1 includes a processing device 102 with a processor 104 for executing one or more applications 116 stored in memory 112. The applications 116 include at least a security manager 106 and a lock screen manager 114. The security manager 106 selectively locks and unlocks the processing device 102 to control access to data stored in association with a user account of the processing device 102. While the processing device 102 is in a locked state, the security manager 106 displays a lock screen 110. Certain inputs received through the lock screen 110 are provided to the lock screen manager 114 to facilitate the saving of messages and/or files while the processing device 102 is in the locked state for subsequent viewing by an intended recipient (e.g., an individual with a user account on the processing device 102). In one implementation, the security manager 106 and/or the lock screen manager 114 are integrated within an operating system of the processing device 102.

The processing device 102 may be a variety of types of electronic devices including, without limitation, a personal computer, tablet, phone, or other device that provides permission-restricted access to stored data. In various implementations, the memory 112 may include internal permanent storage, removable storage, and/or remote storage, such as remote storage that is accessible by the processing device 102 across a wired or wireless network.

The memory 112 additionally includes user data 118, which in one implementation includes local storage, or storage that is physically local to the processing device 102, such as internal storage or storage removably attached to the processing device 102.

In one implementation, the lock screen manager 114 controls permissions to the user data 118. The user data 118 may include some shared directories (e.g., directories that are public or access-restricted to groups of specific users) and/or one or more directories that are access-restricted to a single user account, such as the user account "Sarah" that is shown in FIG. 1.

In different implementations, a user and/or the security manager 106 may selectively transition the processing device to the locked state (e.g., as shown). For example, a user may manually provide an instruction to lock the processing device 102 during an active use session of a user account that is managed by the security manager 106. Alternatively, the security manager 106 may automatically lock the processing device 102, such as after a set period of inactivity in a current use session. In FIG. 1, the lock screen 110 is associated with a particular user account (Sarah") that was active immediately prior to the transitioning of the processing device 102 into the locked state. This account is also herein referred to in the following description as the "locked user account."

The lock screen 110 presents an option 122 that is selectable to request the generation of a message and/or transfer of a file for an intended recipient, such as the owner of the locked user account or owner of another specified user account. In different implementations, the option 122 may assume different forms and provide functionality for copying and/or locally storing different types of data in different ways. Upon selection of the option 122, the lock screen manager 114 solicits user input to request information about a message or file that the messenger wishes to leave for the intended recipient. For example, the lock screen manager 114 presents one or more prompts on the lock screen 110 requesting further information about the message or file.

In one implementation, the messenger selects the option 122 to "leave a message or file," and the lock screen manager 114 presents a prompt on the display 108 requesting content for a note to the intended recipient. The messenger may then compose the note, such as by typing or verbally dictating, and the lock screen manager 114 may then either display the note on the lock screen 110 (such that it is publicly viewable to those in eyesight of the display 108) or, alternatively, save the note for later viewing, such as for subsequent display responsive to authentication of a valid access credential associated with the locked user account.

The option 122 may also permit the messenger to leave a file (e.g., a local copy of a file) in addition to or in lieu of a note. In one such implementation, the messenger selects the option 122, and the lock screen manager 114 presents a prompt on the display 108 regarding the identification and/or location of a source file that the messenger desires to copy to a local storage area accessible to the intended recipient. After selecting the option 122, the messenger additionally provides a file identifier, such as a file path, file name, or other information sufficient for locating a source file for transfer. For example, the lock screen manager 114 may present a prompt (not shown) to solicit the file identifier from the messenger responsive to selection of the option 122.

Using the supplied file identifier, the lock screen manager 114 locates the source file. Responsive to locating the file and/or receipt of other implementation-specific information (e.g., access credentials to the source file, access credentials to a device storing the source file), the lock screen manager 114 copies the source file from a source device 120 to a local storage area (e.g., the user data 118) on the processing device 102. Access to the copied file is then conditioned upon receipt and authentication of an access credential associated with the intended recipient.

In one implementation, access to the copied file is conditioned upon authentication of a recipient access credential associated with the locked user account. For example, access to the file is provided responsive to authentication of a password, an image (e.g., a fingerprint, facial image, retinal scan), and/or voice recognition. In one implementation, access to the copied file is provided responsive to authentication of a password that is saved in association with the locked user account. For example, the intended recipient may unlock the processing device 102 with a password and then navigate to a directory where the copied file is stored (e.g., a directory to which the intended recipient has read and/or write access).

Notably, an individual user may have multiple accounts that are used to access data within an organization. For example, a user may have a personal user account on the processing device 102 and a network account for accessing certain data on other machines within a local area network (LAN). In this case, the user may have a first access credential for unlocking and locking the processing device 102 (e.g., the personal user account) and a second access credential for accessing data on other machines within a local area network (LAN). In one implementation, the recipient access credential for viewing a file or message saved by the lock screen manager 114 includes a credential for unlocking an account that is different than the locked user account, such as a password associated with a network account managed by the owner of the locked user account.

The source device 120 (e.g., the device storing an original copy of a file copied and saved via the illustrated methodology) may be a variety of different types of devices accessible using one or more different communication protocols. In one implementation, the source device 120 is a portable storage device that is removably-coupled to the processing device 102 (e.g., a USB stick, disk). In another implementation, the source device 120 is another processing device that the lock screen manager 114 accesses over a wired or wireless network, such as processing device networked within a same local area network (LAN) as the processing device 102 or a processing device not within the same LAN but otherwise accessible via an internet connection. In still other implementations, the source device 120 is a processing device that communicates with the processing device 102 over a proximity-based communication protocol (e.g., a communication protocol that facilitates communications between devices within a pre-defined physical proximity of one another), such as a Bluetooth communication or a near-field communication (NFC). In this manner, a file or message can be securely copied from the source device 120 to the locked device without unlocking the processing device 102.

Figure 2:
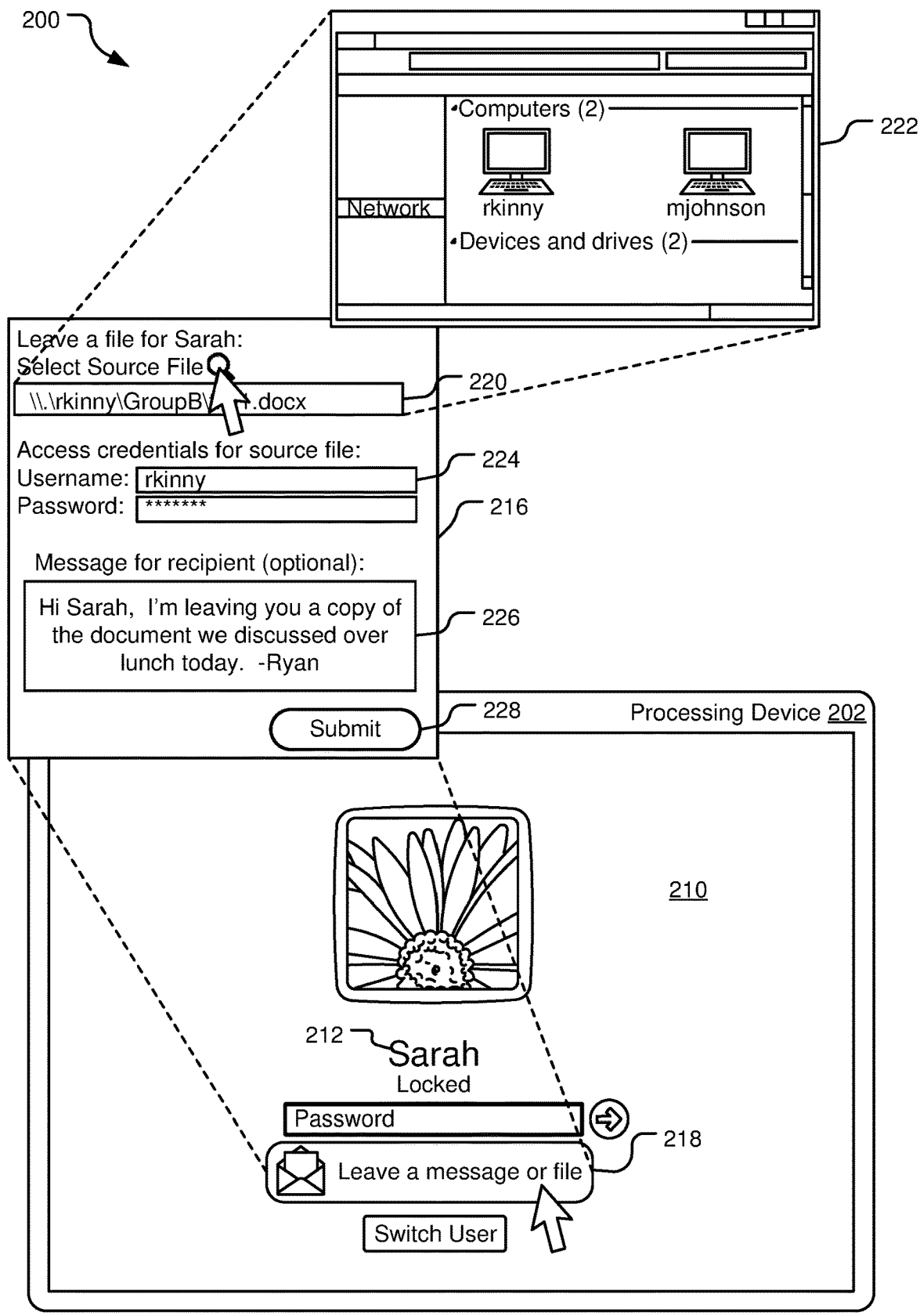
FIG. 2 illustrates features of another example system for sharing data, such as files and/or notes, with a locked device.

FIG. 2 illustrates aspects of another example system 200 for sharing data, such as files and/or notes, with a locked device (e.g., a processing device 202). In the example of FIG. 2, the processing device 202 has been locked from a user account 212 (Sarah), which is in one implementation an account managed by an operating system of the processing device 202. The user account 212 is associated with storage space as well as stored user data and various applications that are accessible through an authenticated session of the user account 212. The user data accessible to the user account 212 may be stored locally on the processing device 202 and/or reside external to the processing device 202, such as on other devices in a local area network (LAN).

When the processing device 202 is in the locked state, a first user "the messenger" interacts with a lock screen 210 to leave a message or file for an intended recipient (e.g., an account owner of the user account 212). In one implementation, the messenger provides input to a user interface of the processing device 202 to generate a local copy of specified content. A lock screen manager may then perform the copying and saving while the user account 212 remains locked or, alternatively, queue the data transfer request for execution at a later time, such as responsive to authorization received from within the user account 212 once it has been unlocked by the account owner. For example, the account owner may unlock the user account 212 and be presented with a request to complete a file transfer request initiated while the processing device 202 was locked.

In one implementation, content that is copied to the processing device 202 as a result of a lock-screen-initiated transfer (as described above) is stored in a secure local storage area that is accessible to the user account 212 associated with the lock screen 210. The secure local storage area may be, for example, a directory that is accessible to the user account 212 but not accessible to other machines and/or users on a same local area network. In some cases (discussed further below), the processing device 202 changes permissions of original source content when copying and saving the content to the secure local storage area.

In FIG. 2, the messenger interacts with the lock screen 210 to initiate a file transfer request or to leave a message for subsequent viewing on the processing device 202. In the example shown, the messenger selects an option 218 to "leave a message or file" and is then presented with a prompt 216, which solicits input about the file and/or content of a message that the messenger wishes to save locally in association with the user account 212. These inputs are herein referred to as "messaging inputs."

In FIG. 2, the prompt 216 represents a non-limiting example of the type of messaging inputs that the messenger may be able to provide to the processing device 202 while the processing device 202 is locked in association with the user account 212. In different implementations, these messaging inputs may be provided in a variety of formats and forms, some of which may not involve direct interaction with the processing device 202. In one implementation, a messenger provides the messaging inputs by interacting with a series of prompts presented on the lock screen 210 (e.g., as shown). In another implementation, some or all of the messaging inputs are initially provided to a user interface of another device that is separate from the processing device 202, such as to a personal computing device which, in turn, transmits the messaging inputs to the processing device 202 in the locked state. The messaging inputs may be collected in different forms, including, without limitation, keyboard, touch, and voice input.

In FIG. 2, the prompt 216 solicits a file identifier 220 from the messenger. The file identifier 220 includes sufficient information for the processing device 202 to locate a specific source file. The file identifier 220 may, for example, specify a file path, filename, or otherwise identify a file or file location. In the illustrated example, the messenger specifies the file identifier 220 by selecting a radio button (e.g., "Select Source File") and by navigating to a particular file within a navigation window 222 presented responsive to selection of the radio button. For example, the navigation window 222 displays other devices on a local area network (LAN), and the messenger selects the file identifier 220 by selecting one of these devices, navigating into a particular directory on the selected device, and clicking on a file of interest. In one implementation, the messenger uses the navigation window 222 to navigate to a menu showing files stored on a removable storage device that he or she has physically inserted into the processing device 202.

In still another implementation, the navigation window 222 includes options for navigating to a device that is not included in a same local area network (LAN) as the processing device 202. For example, the navigation window 222 may allow the messenger to establish a peer-to-peer connection between two devices, such as using a Bluetooth connection to enable a file transfer. In one implementation, the messenger uses the processing device 202 to initiate or accept a Bluetooth pairing with a second device (e.g., a cell phone) and then initiates a file transfer request from a user interface on the second device. For example, the messenger interacts with a file transfer application executing on a personal mobile device to select a file for transfer. The file transfer application, in turn, provides the user input to the lock screen manager of the processing device 202.

In FIG. 2, the prompt 216 additionally requests a source access credential 224 usable to acquire access to the source file. For example, the source access credential 224 may be the username and password for another account (e.g., a user account, network account, or other account) that has access to the source file (e.g., read and write permission and/or execute permissions if the source file is an executable). In some implementations, the lock screen manager may be able to access and copy the source file to local storage on the processing device 202 without utilizing a source access credential 224 supplied by the messenger. For example, the lock screen manager may not request the source access credential 224 if the user account 212 already stores a credential for establishing access to the source file on the source device (e.g., a password to access other devices on a same LAN).

In other cases, however, the user account 212 may not have the appropriate permissions to access the source file specified by the file identifier 220. For example, the source file may reside in an access-restricted directory of another machine on a local area network (LAN). In this scenario, the processing device 202 may utilize the source access credential 224 to acquire access to the source file and may also change file permissions when copying the source file over to a local directory on the processing device 202. For example, access permissions of the source file may be different from the access permissions of the copied file residing locally on the processing device 202.

In FIG. 2, the prompt 216 also includes a message input text box 226 that the messenger can optionally use to compose a message. For example, the messenger may enter text explaining the purpose or content of the copied file. In other implementations, the messenger may interact with the prompt 216 to leave a message without leaving a file and/or may utilize the prompt to leave the intended recipient a file without leaving a message. The prompt 216 further includes a submission button 228 that the messenger may select to finalize a file transfer request or message generation request. Responsive to the messenger's selection of the submission button 228, a file transfer is initiated. In some implementations, the file transfer is fully executed while the processing device 202 is locked. In other implementations, some or all aspects of the file transfer are performed responsive to subsequently-received authorization from a user logged into the user account 212.

To complete the above-described file transfer, the lock screen manager of the processing device 202 uses the file identifier 220 to navigate to the source file, generates a copy of the source file, and saves the copy of the file in a local directory on the processing device 202. In one implementation, the lock screen manager provides the source access credential 224 to a security application executing on an external device, such as a security application that manages network account permissions within an organization. Since the source access credential 224 is a credential for an account that has read and write access to the source file, the remotely-executing security application authorizes the lock screen manager of the processing device 202 to generate a copy the source file.

Figure 3:
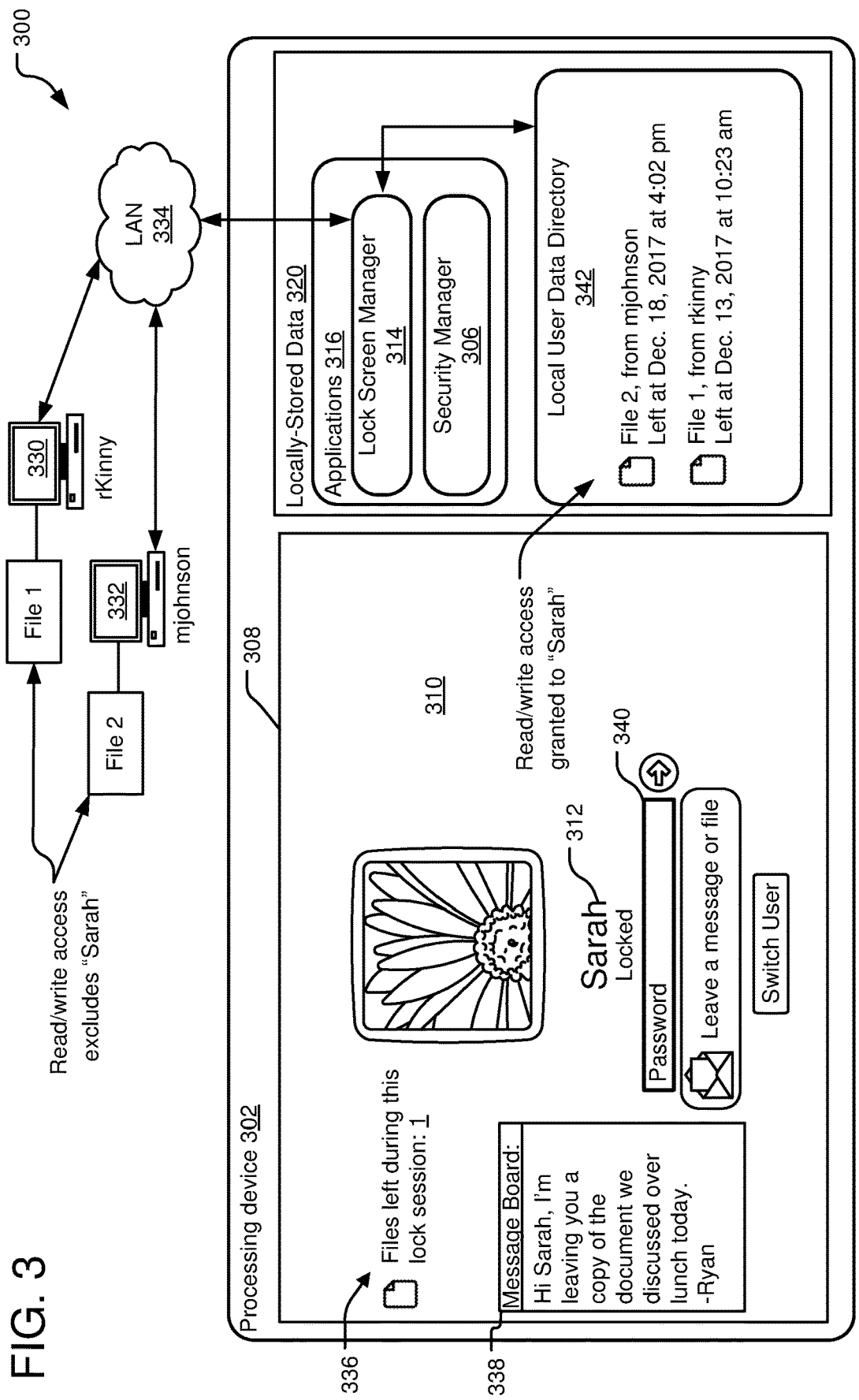
FIG. 3 illustrates features of still another example system for sharing files and/or notes with a locked computing device.

FIG. 3 illustrates aspects of another system 300 that facilitates secure sharing of files and/or notes with a processing device 302 that has been locked by a user. In one implementation, the system 300 includes some or all features discussed above with respect to the system 300.

When the processing device 302 is in a locked state, a person who desires to leave a file or message (e.g., a messenger) may interact with the processing device 302 to specify content for copying from a remote storage location to a local storage location for subsequent viewing by an intended recipient logged into a user account 312 on the processing device 302.

In the illustrated example, the processing device 302 is coupled to two other computers 330 and 332 through a local area network (LAN) 334. The user account 312 has been locked, and a display 308 of the processing device 302 presents a lock screen 310. The processing device 302 stores and executes various applications 316, such as a security manager 306 and a lock screen manager 314. The security manager 306 selectively locks and unlocks the processing device 302 to control access to locally-stored data 320 associated with the user account 312. While the processing device 302 is in a locked state, the lock screen manager 314 facilitates the saving of messages and files for subsequent viewing by an intended recipient viewing and/or interacting with the processing device 302.

The display 308 presents a lock screen 310 that includes a notification 336 indicating that one file has been left in association with the user account 312 during the current lock session. The lock screen 310 also displays a message board 338 displaying messages left in association with the user account 312 during the current lock session.

In FIG. 3, the message board 338 and content of messages left for the message board 338 are publically available to anyone within eyesight of the display 308. In other implementations, however, the message board 338 is not publically available. For example, the lock screen 310 may either not display the message board 338 or display limited information about pending messages left on the message board 338. For example, the message board 338 may display the number of pending messages and/or the source of the messages but not display the content of the actual messages until an access credential is received and authenticated for the user account 312.

In FIG. 3, the lock screen 310 indicates a number of files (e.g., 1 file) for which requests for file sharing were initiated during the current lock session. In different implementations, the lock screen 310 may display different information about these files, such as the messenger name, the names of the shared files, the locations of the shared files, etc. In the illustrated example, the lock screen 310 does not display any information identifying specific file(s) pertaining to the initiated file-sharing requests. When the processing device 302 is unlocked by a user, the user may be presented with a notification indicating the nature and location of such files. In another implementation, the lock screen 310 displays specific information identifying the files shared via the file-sharing request(s) initiated during the lock session.

In one implementation, a user accesses the files left during the lock session by logging into the user account 312 and navigating to a local user data directory 342 maintained by a lock screen manager 314 of the processing device 302. For example, a user "Sarah" logs into the user account 312 by typing her password in a lock screen password prompt 340. Responsive to the authentication of the password, Sarah navigates to the local user data directory 342 where files are routinely saved (copied from other devices) by the lock screen manager 314. In one implementation, Sarah navigates to such content by clicking a shortcut presented responsive to authentication of the password she supplies in the lock screen password prompt 340.

The local user data directory 342 is both read and write accessible to the user account 312 (e.g., the account that is associated with lock screen 310 presented when the file transfer was initiated). In some implementations content in the local user data directory 342 is also accessible to other accounts on a network. For example, the messenger that initiated the copying and storing of a particular file may also have read and write access to the file in the local user data directory 342.

In FIG. 3, the local user data directory 342 includes two files that were copied to the processing device 302 responsive to transfer requests initiated while the processing device 302 was locked in association with the user account 312. The transfer requests were initiated by a user interacting with (e.g., providing inputs to) the lock screen 310. A first file ("File 1") in the local user data directory 342 was copied from a computer 330 (available on the LAN 334) and saved to the illustrated location responsive to a file transfer request initiated during a most-recent lock session of the user account 312. A second file ("File 2") residing in the local user data directory 342 was copied from a computer 332 (available on the LAN 334) and saved to the illustrated location responsive to a file transfer request initiated during a previous lock session of the user account 312.

To complete the copying and transfer of each of the first file ("File 1") and the second file ("File 2") to the local user data directory 342, the lock screen manager 314 navigates to a source file identified by the messenger, copies the file, and alters file permissions. In the illustrated example, the source files for both "File 1" (on the computer 330) and "File 2" (on the computer 332) are permission-controlled and are unable to be accessed from the user account 312 and/or from the processing device 302. For example, Sarah is unable to access these files using either the access credential for the user account 312 or any network account credential saved in association with the user account 312. In order to copy these files from the computers 330, 332 to local storage on the processing device 302, the lock screen manager 314 provides a source access credential (e.g., a different access credential than that associated with the user account 312). In one implementation, the source access credential is supplied by the messenger while the processing device 302 is locked. For example, the source access credential may be a login credential for an account with read and write access to the corresponding source file (File 1 on the computer 330 or File 2 on the computer 332). Responsive to authentication to the source access credential, the computers 330, 332 authorize access to and/or copying of the corresponding source files (File 1, File 2). As a result of these actions, the owner of the user account 312 acquires locally accessible copies of data files that she is unable to access in corresponding source file locations.

In another implementation of the disclosed technology, the lock screen manager 314 alters permissions of a source file but does not copy the file to the processing device 302. For example, the lock screen manager 314 acquires a file identifier identifying a source file on a networked device and also acquires a source access credential for the source file. Using the source access credential, the lock screen manager 314 alters the permissions of the source file residing on the networked device. In one such implementation, the source access credential corresponds to a network account authorized to alter permissions of the source file. The lock screen manager 314 communicates the source access credential to a network-level security manager along with an instruction to alter permissions of the source file and the network-level security manager implements the instruction, ultimately changing the permissions to grant access to the user account 312 or a specified network account associated with the user account 312. In one such implementation, the lock screen manager 314 presents a notification of the source file permission change to the owner of the user account 312, such as a notification displayed on the lock screen 310 or a notification that is displayed responsive to an unlocking of the user account 312. For example, the notification may identify the source file with the newly-altered permissions and the source file location.

Figure 4:
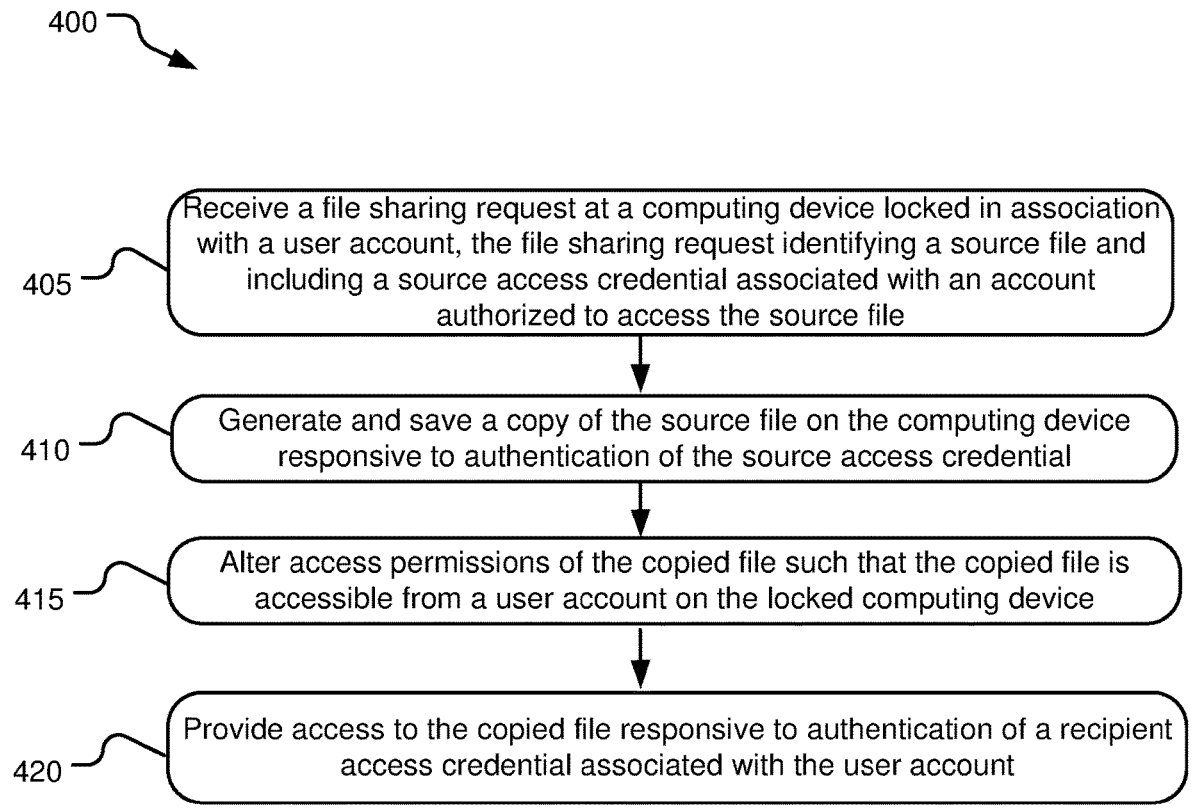
FIG. 4 illustrates example operations for secure sharing of files and/or notes with a locked device.

FIG. 4 illustrates example operations 400 for secure sharing of files and/or notes with a locked computing device. An input collection operation 405 receives a file sharing request at a computing device that is in a locked state. In one implementation, the file sharing request includes user input collected through a locked screen interface of the computing device. In other implementations, some or all of the user input is transmitted to the locked computing device from a secondary device. The file sharing request includes a file identifier identifying a source file residing on another device. For example, the file identifier may include a file path and file name or other information sufficient to locate the source file. In one implementation, the file sharing request additionally includes a source access credential that is associated with an account authorized to access the source file.

A copy and save operation 410 generates and saves a local copy of the source file on the computing device. In some implementations where the file sharing request includes a source access credential, the copy and save operation 410 may be performed in response to authentication of the source access credential. A permission alteration operation 415 alters access permissions of the copied file such that the copied file is accessible from a user account on the computing device. In one implementation, the copy and save operation 410 is performed while the computing device is locked. In another implementation, the copy and save operation 410 is performed after the computing device is subsequently unlocked by a user, such as after the user authorizes the requested file transfer.

An access operation 420 provides access to the copied file responsive to receipt and authentication of a recipient access credential associated with the user account. In one implementation, the recipient access credential includes a credential for logging into the user account (e.g., a credential sufficient to unlock a user account on the locked computing device). In another implementation, the recipient access credential is not for the user account but for another account managed by the owner of the user account and/or stored in memory in association with the user account. For example, the credential may be a network access credential that is stored for the user account.

Figure 5:
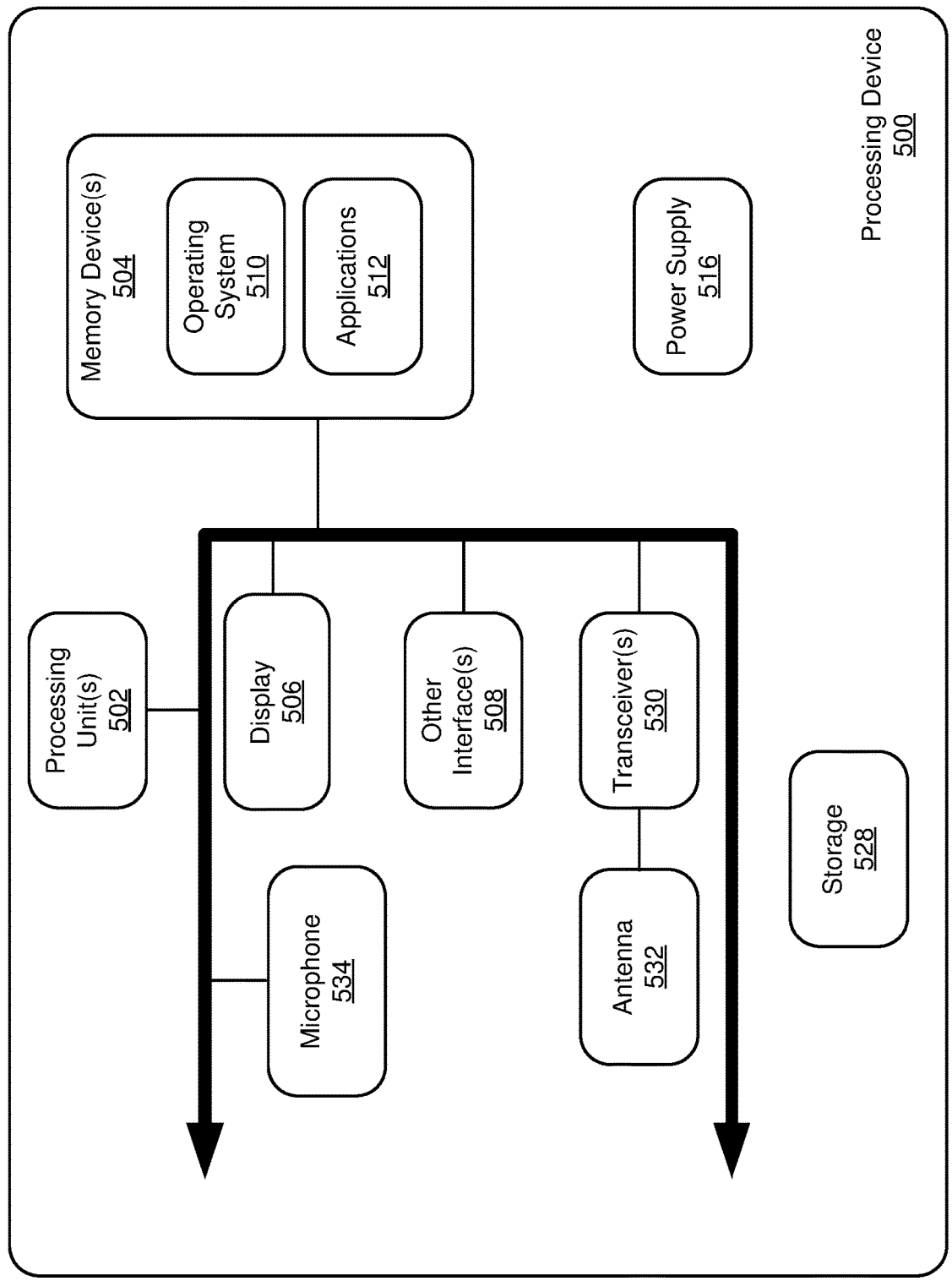
FIG. 5 illustrates an example schematic of a processing device suitable for implementing aspects of the disclosed technology.

FIG. 5 illustrates an example schematic of a processing device 500 suitable for implementing aspects of the disclosed technology. The processing device 500 includes one or more processing unit(s) 502, one or more memory devices 504, a display 506, and other interfaces 508 (e.g., buttons). The memory devices 504 generally includes both volatile memory (e.g., RAM) and non-volatile memory (e.g., flash memory). An operating system 510, such as the Microsoft Windows® operating system, the Microsoft Windows® Phone operating system or a specific operating system designed for a gaming device, resides in the memory devices 504 and is executed by the processing unit(s) 502, although other operating systems may be employed.

One or more applications 512, such as a device security application (e.g., the security manager 106 of FIG. 1) or messaging application (e.g., the lock screen manager 114 of FIG. 1), are loaded in the memory device(s) 504 and are executed on the operating system 510 by the processing unit(s) 502. The processing device 500 includes a power supply 516, which is powered by one or more batteries or other power sources and which provides power to other components of the processing device 500. The power supply 516 may also be connected to an external power source that overrides or recharges the built-in batteries or other power sources.

The processing device 500 includes one or more communication transceivers 530 and an antenna 532 to provide network connectivity (e.g., a mobile phone network, Wi-Fi®, BlueTooth®). The processing device 500 may also include various other components, such as a positioning system (e.g., a global positioning satellite transceiver), one or more accelerometers, one or more cameras, an audio interface (e.g., a microphone 534, an audio amplifier and speaker and/or audio jack), and storage devices 528. Other configurations may also be employed. In an example implementation, various applications are embodied by instructions stored in memory device(s) 504 and/or storage devices 528 and processed by the processing unit(s) 502. The memory device(s) 504 may include memory of a host device or of an accessory that couples to a host.

The processing device 500 may include a variety of tangible computer-readable storage media and intangible computer-readable communication signals. Tangible computer-readable storage can be embodied by any available media that can be accessed by the processing device 500 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing device 500. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

An example method disclosed herein includes receiving a file sharing request at a processing device that is in a locked state. The file sharing request includes at least a file identifier identifying a location of a source file, and the method further includes providing a user account of the processing device with access to content of the source file responsive to authentication of a recipient access credential associated with the user account.

In another example method of any preceding method, the method further comprises generating a copy of the source file based on the file identifier, the copy of the source file being accessible from the user account of the processing device.

In yet another example method of any preceding method, the location of the source file corresponds to a storage location in a secondary device and the method further includes copying the source file from the secondary device and saving the copy of the source file to memory of the processing device.

In still another example method of any preceding method, receiving the file sharing request includes receiving input received through a lock screen interface of the processing device.

In another example method of any preceding method, the method further includes altering access permissions of the source file.

In still another example method of any preceding method, the method further includes receiving a source access credential at the processing device. The source access credential is associated with a system account authorized to access the source file, and the method further includes generating a copy of the source file responsive to authentication of the source access credential altering access permissions of the copy of the source file to permit access to the copy in association with the recipient access credential.

In yet another example method of any preceding method, the method further includes displaying a notification on a lock screen of the processing device, the notification informing a user of the location of the content.

In still another example method of any preceding method, displaying the notification further includes displaying the notification responsive to a transitioning of the processing device from the locked state to an unlocked state.

An example system disclosed herein includes a means for receiving a file sharing request at a processing device that is in a locked state, where the file sharing request includes at least a file identifier identifying a location of a source file. The system further includes a means for providing a user account of the processing device with access to content of the source file responsive to authentication of a recipient access credential associated with the user account.

An example system disclosed herein includes a security manager stored in memory and executable by a processor to transition a processing device into a locked state. The security manager is configured to receive a file sharing request while the processing device is in the locked state, the file sharing request includes at least a file identifier identifying a location of a source file. The system further includes a lock screen manager stored in the memory and executable by the processor to provide a user account of the processing device with access to content of the source file responsive to authentication of a recipient access credential associated with the user account.

In another example system of any preceding system, the lock screen manager is further configured to generate a copy of the source file based on the file identifier, the copy being accessible from the user account.

In another example system of any preceding system, the location of the source file is a memory location within a secondary device and the lock screen manager is further executable to provide the access to the content by generating a copy of the source file and saving the copy of the source file to memory of the processing device.

In another example system of any preceding system, the lock screen manager provides the access to the content of the source file in response to a transitioning of the processing device from a locked state into an unlocked state.

In still another example system of any preceding system, the lock screen manager is further executable to alter access permissions of the source file.

In yet another example system of any preceding system, the lock screen manager is further executable to receive a source access credential associated with a system account authorized to access the source file; generate a copy of the source file responsive to authentication of the source access credential; and alter access permissions of the copy of the source file to permit access in association with the recipient access credential.

In another example system of any preceding system, the file sharing request includes receiving user input received through a lock screen interface of the processing device.

An example computer-readable storage media disclosed herein encodes a computer process that includes receiving a file sharing request at a processing device in a locked state, the file sharing request including at least a file identifier identifying a location of a source file; and providing a user account of the processing device with access to content of the source file responsive to authentication of a recipient access credential associated with the user account.

Another example computer-readable storage media according to any preceding computer-readable storage media encodes, a computer process that further includes generating a copy of the source file based on the file identifier, where the copy of the source file is accessible from the user account of the processing device.

In still another example computer-readable storage media according to any preceding computer-readable storage media, the location of the source file corresponds to a storage location in a secondary device and providing the access to the content further includes copying the source file from the secondary device and saving the copy of the source file to memory of the processing device.

In still another example computer-readable storage media according to any preceding computer-readable storage media, providing the access to the content of the source file further comprises altering access permissions of the source file.

In still another example computer-readable storage media according to any preceding computer-readable storage media, the encoded computer process further includes receiving a source access credential at the processing device, where the source access credential is associated with a system account authorized to access the source file. The process further includes generating a copy of the source file responsive to authentication of the source access credential and altering access permissions of copy of the source file to permit access in association with the recipient access credential.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A method comprising:
   receiving a file sharing request at a processing device in a locked state, the file sharing request including at least a file identifier identifying a location of a remotely-stored source file; and
   transitioning the processing device from the locked state to an unlocked state responsive to receipt and authentication of a recipient access credential associated with a user account of the processing device; and
   using the file identifier to provide the user account of the processing device with access to content of the remotely-stored file source file responsive to the transitioning of the processing device from the locked state to the unlocked state.

2. The method of claim 1, wherein using the file identifier to provide the user account with access to content of the remote-stored source file further comprises:
   generating a copy of the remotely-stored source file based on the file identifier, the copy of the source file being accessible from the user account of the processing device.

3. The method of claim 1, wherein the location of the source file corresponds to a storage location in a secondary device and wherein using the file identifier to provide the user account with access to content of the remote-stored source file further comprises:
   copying the remotely-stored source file from the secondary device and saving the copy of the source file to memory of the processing device.

4. The method of claim 1, wherein receiving the file sharing request includes receiving input received through a lock screen interface of the processing device.

5. The method of claim 1, wherein using the file identifier to provide the user account with access to content of the remote-stored file further comprises:
   altering access permissions of the remotely-stored source file.

6. The method of claim 1, further comprising:
   receiving a source access credential at the processing device, the source access credential associated with a system account authorized to access the source file;
   responsive to authentication of the source access credential, generating a copy of the remotely-stored source file; and
   altering access permissions of the copy of the source file to permit access to the copy in association with the recipient access credential.

7. The method of claim 1, further comprising:
   displaying a notification on a lock screen of the processing device, the notification informing a user of the location of the content.

8. The method of claim 7, wherein displaying the notification further includes displaying the notification responsive to a transitioning of the processing device from the locked state to an unlocked state.

9. A system comprising:
   a security manager stored in memory and executable by a processor to transition a processing device into a locked state, the security manager configured to receive a file sharing request while the processing device is in the locked state, the file sharing request including at least a file identifier identifying a location of a remotely stored source file; and
   a lock screen manager stored in the memory and executable by the processor to:
   transition the processing device from the locked stated into an unlocked state responsive to receipt and authentication of a recipient access credential associated with a user account of the processing device; and
   use the file identifier to provide the user account of the processing device with access to content of the remotely-stored source file responsive to the transitioning of the processing device from the locked state to the unlocked state.

10. The system of claim 9, wherein the lock screen manager is further executable to generate a copy of the remotely-stored source file based on the file identifier, the copy being accessible from the user account.

11. The system of claim 9, wherein the location of the remotely-stored source file is a memory location within a secondary device and the lock screen manager is further executable to provide the access to the content by generating a copy of the remotely-stored source file and saving the copy of the source file to memory of the processing device.

12. The system of claim 9, wherein the lock screen manager is further executable to
   alter access permissions of the remotely-stored source file.

13. The system of claim 9, wherein the lock screen manager is further executable to:
   receive a source access credential associated with a system account authorized to access the remotely-stored source file;
   generate a copy of the remotely-stored source file responsive to authentication of the source access credential; and
   alter access permissions of the copy of the remotely-stored source file to permit access in association with the recipient access credential.

14. The system of claim 9, wherein the file sharing request includes receiving user input received through a lock screen interface of the processing device.

15. One or more computer-readable storage media of a tangible article of manufacture encoding computer-executable instructions for executing on a computer system a computer process, the computer process comprising:
receiving a file sharing request at a processing device in a locked state, the file sharing request including at least a file identifier identifying a location of a remotely-stored source file; and
transitioning the processing device from the locked state to an unlocked state responsive to receipt and authentication of a recipient access credential associated with a user account of the processing device; and
using the file identifier to provide user account of the processing device with access to content of the remotely-stored source file responsive to the transitioning of the processing device from the locked stated to the unlocked state.

16. The one or more computer-readable storage media of claim 15, wherein using the file identifier to provide the user account with access to content of the remote-stored source file further comprises:
generating a copy of the remotely-stored source file based on the file identifier, the copy of the source file being accessible from the user account of the processing device.

17. The one or more computer-readable storage media of claim 15, wherein the location of the source file corresponds to a storage location in a secondary device and wherein using the file identifier to provide the user account with access to content of the remote-stored source file further comprises:
copying the remotely-stored source file from the secondary device and saving the copy of the source file to memory of the processing device.

18. The one or more computer-readable storage media of claim 15, wherein using the file identifier to provide the user account with access to content of the remote-stored source file further comprises:
altering access permissions of the source file.

19. The one or more computer-readable storage media of claim 15, wherein the computer process further comprises:
receiving a source access credential at the processing device, the source access credential associated with a system account authorized to access the source file;
responsive to authentication of the source access credential, generating a copy of the remotely-stored source file; and
altering access permissions of the copy of the source file to permit access in association with the recipient access credential.

* * * * *